US 8,813,471 B2

(12) United States Patent
Gulen et al.

(10) Patent No.: US 8,813,471 B2
(45) Date of Patent: Aug. 26, 2014

(54) SYSTEM FOR FUEL GAS MOISTURIZATION AND HEATING

(75) Inventors: Seyfettin Can Gulen, Niskayuna, NY (US); Jatila Ranasinghe, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 727 days.

(21) Appl. No.: 13/172,024

(22) Filed: Jun. 29, 2011

(65) Prior Publication Data

US 2013/0000272 A1 Jan. 3, 2013

(51) Int. Cl.
| | |
|---|---|
| F02C 6/00 | (2006.01) |
| F02G 1/00 | (2006.01) |
| F02G 3/00 | (2006.01) |
| F02C 7/08 | (2006.01) |
| F02C 7/00 | (2006.01) |
| F02C 6/18 | (2006.01) |

(52) U.S. Cl.
CPC . F02C 6/18 (2013.01); Y02E 20/16 (2013.01); Y02E 20/14 (2013.01)
USPC ....... 60/39.182; 60/39.5; 60/39.53; 60/39.59; 60/736

(58) Field of Classification Search
CPC .................................. F02C 3/30; F01K 11/00
USPC ................ 60/39.182, 39.5, 39.53, 39.59, 736
See application file for complete search history.

(56) References Cited

U.S. PATENT DOCUMENTS

| | | | |
|---|---|---|---|
| 3,731,485 A * | 5/1973 | Rudolph et al. ................ 60/775 |
| 4,354,347 A * | 10/1982 | Tomlinson et al. ........ 60/39.182 |
| 4,402,183 A * | 9/1983 | Dimitroff et al. ............... 60/660 |
| 4,491,093 A * | 1/1985 | Hoekstra ....................... 122/420 |
| 5,165,239 A | 11/1992 | Bechtel et al. |
| 5,241,816 A | 9/1993 | Drnevich |
| 5,345,756 A * | 9/1994 | Jahnke et al. ................... 60/781 |
| 5,628,183 A * | 5/1997 | Rice ........................... 60/39.182 |
| 5,906,095 A * | 5/1999 | Frutschi et al. ................ 60/775 |
| 6,343,462 B1 | 2/2002 | Drnevich et al. |
| 6,370,880 B1 * | 4/2002 | Smith et al. ..................... 60/775 |
| 6,389,794 B2 | 5/2002 | Ranasinghe et al. |
| 6,446,440 B1 * | 9/2002 | Ranasinghe et al. ........... 60/775 |
| 6,502,402 B1 * | 1/2003 | Smith et al. ..................... 60/775 |
| 6,694,744 B1 * | 2/2004 | Smith ............................. 60/775 |
| 6,983,585 B2 * | 1/2006 | Hattori et al. .............. 60/39.182 |
| 7,444,819 B2 | 11/2008 | Shibata et al. |
| 8,539,750 B2 * | 9/2013 | Bellows et al. ................ 6/39.55 |
| 2007/0017207 A1 * | 1/2007 | Smith et al. ................ 60/39.182 |
| 2010/0031625 A1 * | 2/2010 | Narayan et al. ................ 60/39.5 |
| 2010/0031933 A1 * | 2/2010 | Narayan et al. ............... 123/543 |
| 2011/0107737 A1 * | 5/2011 | Mishima et al. ........... 60/39.461 |
| 2011/0265444 A1 * | 11/2011 | Bellows et al. ............ 60/39.182 |
| 2011/0296988 A1 * | 12/2011 | Buhrman et al. ................. 95/34 |

* cited by examiner

*Primary Examiner* — Phutthiwat Wongwian
*Assistant Examiner* — Rene Ford
(74) *Attorney, Agent, or Firm* — Ernest G. Cusick; Frank A. Landgraff

(57) ABSTRACT

Embodiments of the present invention may provide to a gas turbine a fuel gas saturated with water heated by a fuel moisturizer, which receives heat form a flash tank. A heat source for the flash tank may originate at a heat recovery steam generator. The increased mass flow associated with the saturated fuel gas may result in increased power output from the associated power plant. The fuel gas saturation is followed by superheating the fuel, preferably with bottom cycle heat sources, resulting in a larger thermal efficiency gain.

9 Claims, 5 Drawing Sheets

SYSTEM FOR FUEL GAS MOISTURIZATION AND HEATING

BACKGROUND OF THE INVENTION

The present invention relates generally to a gas fired turbomachine coupled to a heat recovery steam generator (HRSG); and more particularly to a modified bottoming cycle for fuel gas saturation and heating to increase power output and thermodynamic efficiency.

Some power plants utilize a gas turbine that is thermally coupled to a HRSG. The HRSG may be a non-contact heat exchanger that allows feed water for a steam generation process to be heated by exhaust gases of the gas turbine. The HRSG has a duct with tube bundles interposed therein such that the feed water is evaporated to steam as the gas turbine exhaust gas passes through the duct. The efficiency of this arrangement lies in the utilization of the otherwise wasted exhaust gas energy.

Modern HRSGs typically employ multiple pressure sections to recover the maximum energy from the exhaust gas. For example, the HRSGs utilized to recover the exhaust gas energy from advanced heavy-duty industrial gas turbines (commonly referred to as the F, G or H-Class machines) have three sections where steam is generated at high, medium (or intermediate), and low pressures. Earlier variants typically have two pressure levels. Furthermore, the aforementioned HRSGs also have a reheater section, where steam returning from the high pressure (HP) steam turbine is reheated to the same temperature as the HP steam for better efficiency. As such, the installation costs associated with multiple pressure reheat HRSGs are considerably higher than earlier HRSGs with two or even single pressure level and no reheat (commonly used with earlier generation heavy-duty industrial GTs also known as "E-Class" machines). The structural configuration and thermal flow paths are quite complex. The operation of modern HRSGs with multiple pressure levels is considerably more involved than a simple waste heat recovery boiler, including evaporator (boiler) drum level and pressure controls, temperature control for steam using attemperation via desuperheating water sprays and low pressure (LP) economizer recirculation for maintaining the economizer tube metal temperature above a minimum to prevent corrosion.

For the foregoing reasons, there is a desire for a system that provides the highest possible efficiency and output with the simplest and cost-effective HRSG configuration. The system will ideally have steam production only at a single pressure, non-reheat and thereby eliminating expensive evaporator sections with cylindrical, thick-walled drums and associated controls comprising valves and headers and reheat superheater sections with alloy steel finned tubes. Further reduction in complexity and cost comes from reduced length and footprint and requisite reinforced concrete foundation. Even further reduction in installed cost and complexity will be achieved via the simpler and less expensive steam turbine associated with the single-pressure steam produced in the one-pressure no reheat HRSG.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment of the present invention, a system comprising a power plant comprising a gas turbine comprising a compressor, a combustion system, and a turbine section, which collectively generates an exhaust gas stream; and a HRSG comprising a heat-exchanging section that receives the said exhaust gas stream and evaporates water into steam; a fuel moisturizer that creates saturated fuel gas, comprising an inlet comprising piping that receives water at a first temperature; a fuel gas inlet comprising piping that receives the fuel gas in an unsaturated or a dry condition; a direct contact heat and mass transfer area that mixes the water and the fuel gas to create saturated fuel gas; an outlet that discharges the water at a second temperature, which is lower than the first temperature; wherein the water flows through associated piping to the HRSG; and a fuel gas outlet comprising piping that discharges the saturated fuel gas; a flash tank comprising a supply comprising piping that receives water from the HRSG; a steam outlet comprising piping that discharges steam generated within the flash tank; a discharge comprising piping that connects to the inlet of the fuel moisturizer, allowing the remaining water to flow from the flash tank to the fuel moisturizer; and wherein the flash tank rapidly reduces the pressure of the water received from the supply, causing a portion of the water to flash to steam; a fuel gas superheater comprising a water supply comprising piping that receives water at a first temperature from the HRSG; a fuel gas inlet comprising piping that receives the saturated fuel gas from the fuel moisturizer; a heat exchanging area that allows heat to transfer from the water to the saturated fuel gas, operatively creating superheated, saturated fuel gas; a water discharge comprising piping that discharges the water at a second temperature, and a fuel gas outlet comprising piping that discharges the superheated, saturated fuel gas, which is operatively consumed by the combustion system of the gas turbine.

In accordance with a second embodiment of the present invention, a system comprising, in addition to the components listed in the first embodiment above, a steam turbine that receives the steam from the HRSG via associated piping and generates useful shaft power. The said steam turbine can be a back-pressure turbine with the exhaust supplied to a certain process user or it can be equipped with a condenser connected to the steam turbine, wherein the condenser comprises piping and structure that receives the steam from the steam turbine and condenses it to water utilizing an external heat sink.

In accordance with a third embodiment of the present invention, a system comprising: a power plant comprising: a gas turbine comprising a compressor, a combustion system, and a turbine section which collectively generate an exhaust; and a HRSG comprising a heat-exchanging section that receives the exhaust and evaporates water into steam; a fuel moisturizer that creates saturated fuel gas, comprising: an inlet comprising piping that receives water at a first temperature; a fuel gas inlet comprising piping that receives the fuel gas in an unsaturated or a dry condition; a direct contact heat and mass transfer area that mixes the water and the fuel gas to create saturated fuel gas; an outlet that discharges the water at a second temperature, which is lower than the first temperature; wherein the water flows through associated piping to the HRSG; and a fuel gas outlet comprising piping that discharges the saturated fuel gas; a flash tank comprising: a supply comprising piping that receives water from the HRSG; a steam outlet comprising piping that discharges steam generated within the flash tank; wherein associated piping connects the steam outlet to the fuel moisturizer inlet; a discharge comprising piping that connects to the inlet of the fuel moisturizer, allowing water to flow from the flash tank to fuel moisturizer; and wherein the flash tank rapidly reduces the pressure of the water received from the supply, causing a portion of the water to flash to steam, which discharges out the steam outlet, and causing the remaining portion of the water to flow to the fuel moisturizer via the discharge; and a fuel superheater comprising: a water supply comprising piping that receives water at a first temperature from the HRSG; a fuel gas inlet comprising piping that receives the saturated fuel gas from the fuel moisturizer; a heat exchanging area that allows heat to transfer from the water to the saturated fuel gas, operatively creating superheated, saturated fuel gas; a water discharge comprising piping that discharges the water at a second temperature, and a fuel gas outlet comprising piping that discharges the superheated, saturated fuel gas.

BRIEF DESCRIPTION OF THE DRAWINGS

These and other features, aspects, and advantages of the present invention may become better understood when the following detailed description is read with reference to the accompanying figures (FIGS) in which like characters represent like elements/parts throughout the FIGS.

DETAILED DESCRIPTION OF THE INVENTION

Figure 1:
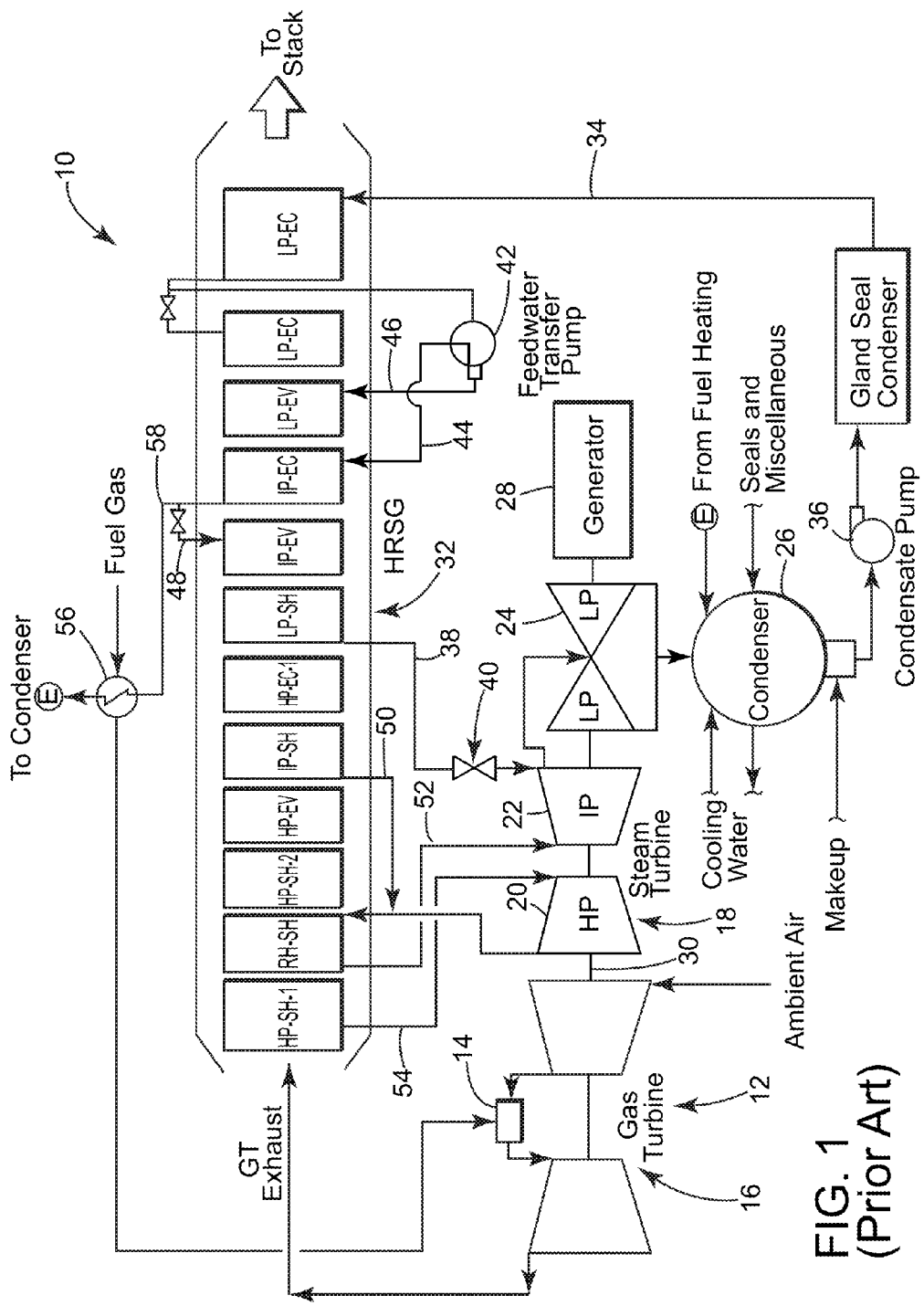
FIG. 1 is a schematic view of a power plant incorporating a conventional multiple pressure reheat HRSG system.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for the purpose of describing the example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the FIGS. Indeed, the element or elements of an embodiment of the present invention may be oriented in any direction and the terminology, therefore, should be understood as encompassing such variations unless specified otherwise.

Embodiments of the present invention provide a single-pressure, non-reheat HRSG based bottoming cycle. In this configuration, a portion of the high-pressure (HP) economizer water may be flashed to provide steam and hot water to moisturize and heat the fuel gas supply to the gas turbine. This configuration may also use some of the HP economizer water to superheat the fuel gas after moisturization and before the combustion process occurs. Saturated moist fuel gas (referenced herein as "saturated fuel gas") comprises the maximum possible amount of water vapor at the existing pressure and temperature conditions. A good analogy to saturated moist fuel gas is air with 100% relative humidity.

The present invention may be applied to a variety of power plants that include a gas turbine and a single-pressure, non-reheat HRSG. This may include, but is not limited to, the following configurations: simple cycle (gas turbine only), steam and gas turbine combined cycle, simple or combined cycle for electric power generation only, simple or combined cycle for cogeneration of electric power and steam (commonly referred to as Combined Heat and Power or CHP in Europe), or other similar permutations. Although the following discussion relates to the power plant configuration illustrated in each figure, embodiments of the present invention may be applied to a power plant with a different configuration. For example, but not limited to, the present invention may apply to a power plant with different or additional components than those illustrated in each figure.

Referring now to the FIGS, where the various numbers represent like components throughout the several views, FIG. 1 is a schematic view of a power plant 10 incorporating a conventional three pressure reheat combined cycle power plant 10 with fuel heating. The power plant 10 includes a gas turbine 12 comprising a compressor, a combustion system 14 and a turbine section 16; and a steam turbine 18 which comprises including a high pressure (HP) section 20, an intermediate pressure (IP) section 22, and one or more low pressure (LP) sections 24 with multiple steam admission points at different pressures. The LP section 24 discharges into a condenser 26. The steam turbine 18 drives a generator 28 that produces electrical power. The gas turbine 12, steam turbine 18, and generator 28 are arranged in tandem, on a single shaft 30, commonly called a combined cycle configuration, which is also known by other names trademarked by various equipment manufacturers, e.g., "STAG™" (STeam And Gas) by General Electric.

The steam turbine system 18 is associated with a multi-pressure HRSG 32 which includes a low pressure economizer (LP-EC), a low pressure evaporator (LP-EV), a high pressure economizer (HP-EC-2), an intermediate pressure economizer (IP-EC), an intermediate pressure evaporator (IP-EV), a low pressure superheater (LP-SH), a final high pressure economizer (HP-EC-1), an intermediate pressure superheater (IP-SH), a high pressure evaporator (HP-EV), a high pressure superheater section (HP-SH-2), a reheater (RH-SH), and a final high pressure superheater section (HP-SH-1).

Water, which results from steam condensing, is fed from the condenser 26 to the HRSG 32 via conduit 34 with the aid of the water pump 36. The water subsequently passes through the LP-EC and into the LP-EV. In a known manner, steam from the LP-EV is fed to the LP-SH and then returned to the low pressure section 24 of the steam turbine 18 via conduit 38 and appropriate LP admissions stop/control valve(s) schematically depicted at 40. Feed water, with the aid of feed water pump(s) 42, flows: (1) through the IP-EC via conduit 44 and to the IP-EV via conduit 48, (2) through the HP-EC-2 via conduit 46, and (3) then on to the final HP-EC-1 (conduit not shown). At the same time, steam from the IP-EV flows through the IP-SH and then flows through the reheater RH-SH via conduit 50. The reheated steam is returned to the IP section 22 of the steam turbine 18 via conduit 52.

Meanwhile, water in the final HP-EC-1 flows to the HP-EV. Steam exiting the HP-EV flows through the superheater sections HP-SH-2 and HP-SH-1 and is returned to the high pressure section 20 of the steam turbine 18 by way of conduit 54 and appropriate stop/control valves (not illustrated in FIG. 1).

The source for the fuel heater 56 in this example is an extraction 58 from the intermediate pressure economizer (IP-EC) outlet. Extraction from other sections of the HRSG or the steam turbine 18 is also possible. Adding heat to the fuel from a bottoming cycle energy source reduces the gas turbine energy input by an amount equal to the heat added, with a corresponding reduction in the fuel gas consumption.

Although there is a reduction in the plant net power output due to the use of a bottoming cycle energy source for fuel heating, particularly when heating the fuel above the LP steam temperature, the reduction of the heat consumption would result in an increase in the thermodynamic efficiency if an appropriate heat source is selected. While the economic value of the increased thermodynamic efficiency is considerably higher than the cost of the lost power output in most instances, the benefit is nevertheless reduced due to the loss in the power plant output.

Figure 2:
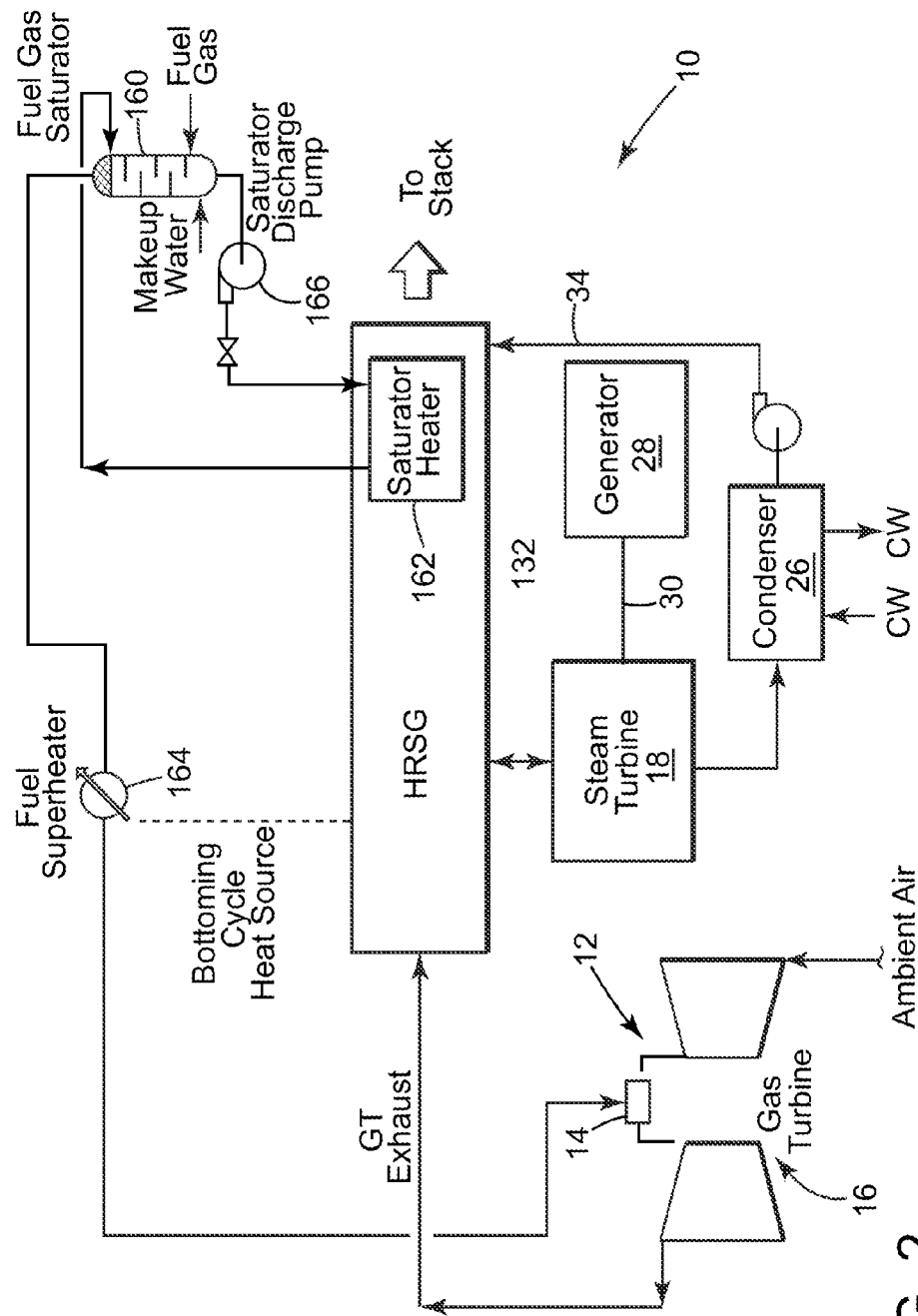
FIG. 2 is a schematic view of a power plant incorporating a known multiple pressure reheat HRSG system that incorporates a fuel moisturization system.

FIG. 2 is a schematic view of a known embodiment of a power plant 10 incorporating a known multiple pressure reheat HRSG 12 that incorporates a fuel moisturization system. The basic concept of the fuel moisturization is discussed with reference to FIG. 2. For convenience, components that correspond to those identified above with reference to FIG. 1 are identified with similar reference numerals but are only discussed in particular as necessary or desirable for understanding the fuel saturation and fuel heating components and process.

As illustrated in FIG. 2, fuel gas is sent to a saturator 160. Here the fuel gas absorbs water and is heated simultaneously by direct contact with hot water in a packed or trayed column. This process of simultaneous heat and mass transfer from hot water to the cooler and drier fuel gas is commonly known as moisturization. The packed column is commonly known as a saturator or, in the context of a gas turbine power plant burning a gaseous fuel, which is moisturized in the saturator prior to combustion, as a fuel moisturizer. This term will be used herein for the description of the current invention. The amount of water that can be absorbed by the fuel gas may be directly proportional to the temperature of the hot water supplied to the fuel moisturizer. Generally, the hotter the water temperature, the moister is the fuel gas exiting the fuel moisturizer. As explained below, this basic fundamental characteristic of the fuel moisturization process is the driver behind the current invention.

The fuel moisturizer bottoms water is heated by the gas turbine exhaust in the fuel moisturizer heater 162. The fuel moisturizer heater 162 is placed in an optimal location relative to other HRSG tube banks, which heat the cycle working fluid. Makeup water is provided to the fuel moisturizer 160 to replace the water absorbed by the fuel gas. The saturated fuel gas exiting the fuel moisturizer 160 is then heated in a fuel superheater 164 using, in the illustrated embodiment, a bottoming cycle heat source. The appropriate selection of bottoming cycle heat source(s) for the fuel moisturizer heater 162 and the fuel superheater 164 may result in a performance enhancement for the power cycle.

The addition of moisture to the fuel gas by the fuel moisturizer 160 increases the mass flow rate of the fuel gas without changing its total heating value (also considered the total energy content). This increased mass flow rate, for the same total heating value, may increase the power output of both the gas and steam turbines. Moreover, the use of low grade energy to moisten the dry fuel gas should result in a gain in thermodynamic efficiency. This low grade energy is not useful for steam production and is otherwise discharged to the environment through the stack. This is reflected as a reduction in the HRSG stack gas temperature via additional heat extracted from the exhaust gas for useful shaft work generation and a corresponding decrease in thermodynamic exergy loss via stack gas exiting the HRSG 132. Furthermore, presence of moisture in the fuel gas acts as a moderator in the reaction zone of the gas turbine combustor 14 and reduces the reaction temperature. This reduces the amount of NOx production without a reduction in gas turbine firing temperature. Fuel moisturization is described in more detail in commonly owned U.S. Pat. No. 6,389,794, which is incorporated herein by reference.

Figure 3:
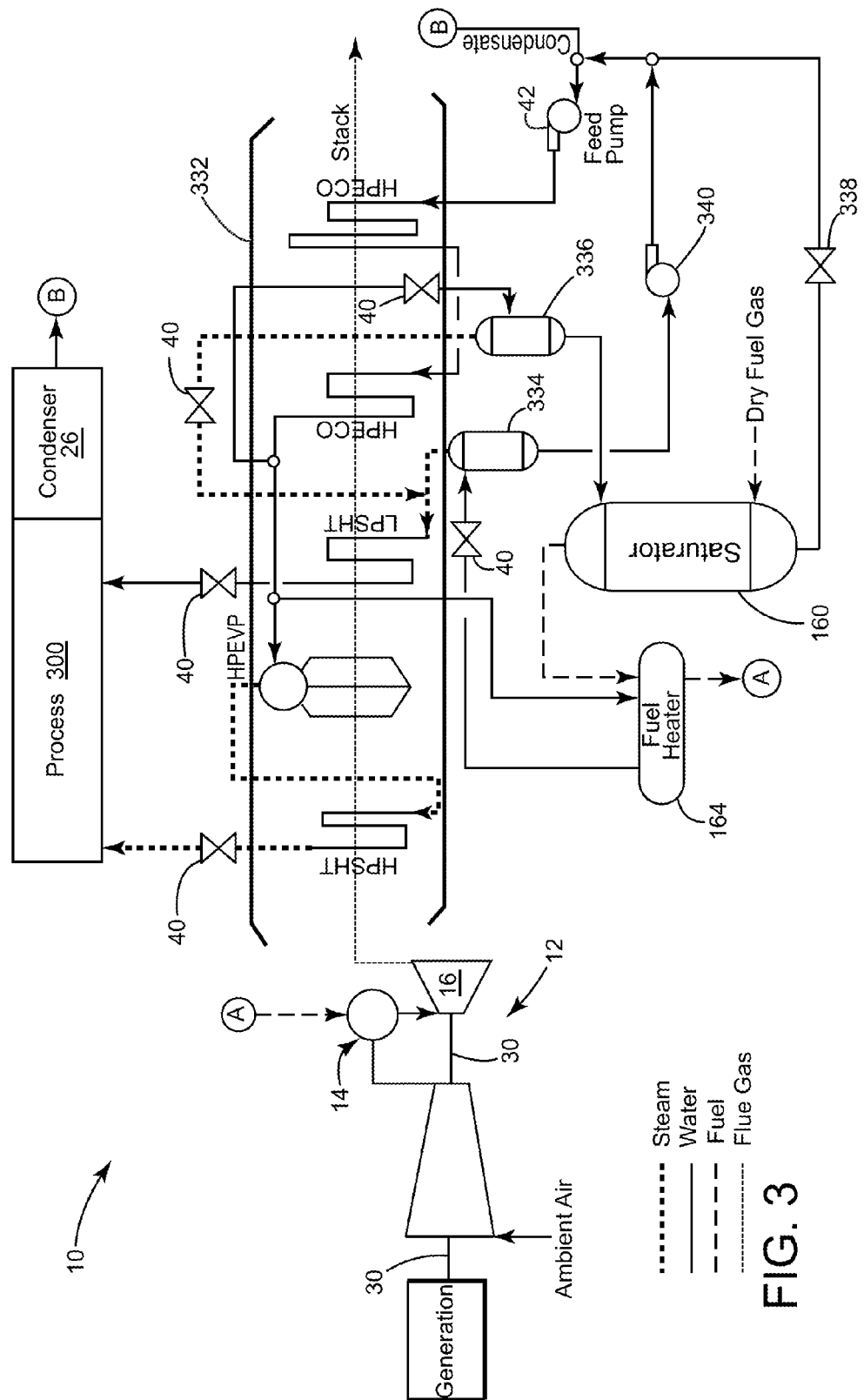
FIG. 3 is a schematic view of a power plant incorporating a single pressure, non-reheat, HRSG thermally coupled with a fuel moisturization system, in accordance with a first embodiment of the present invention.
Figure 4:
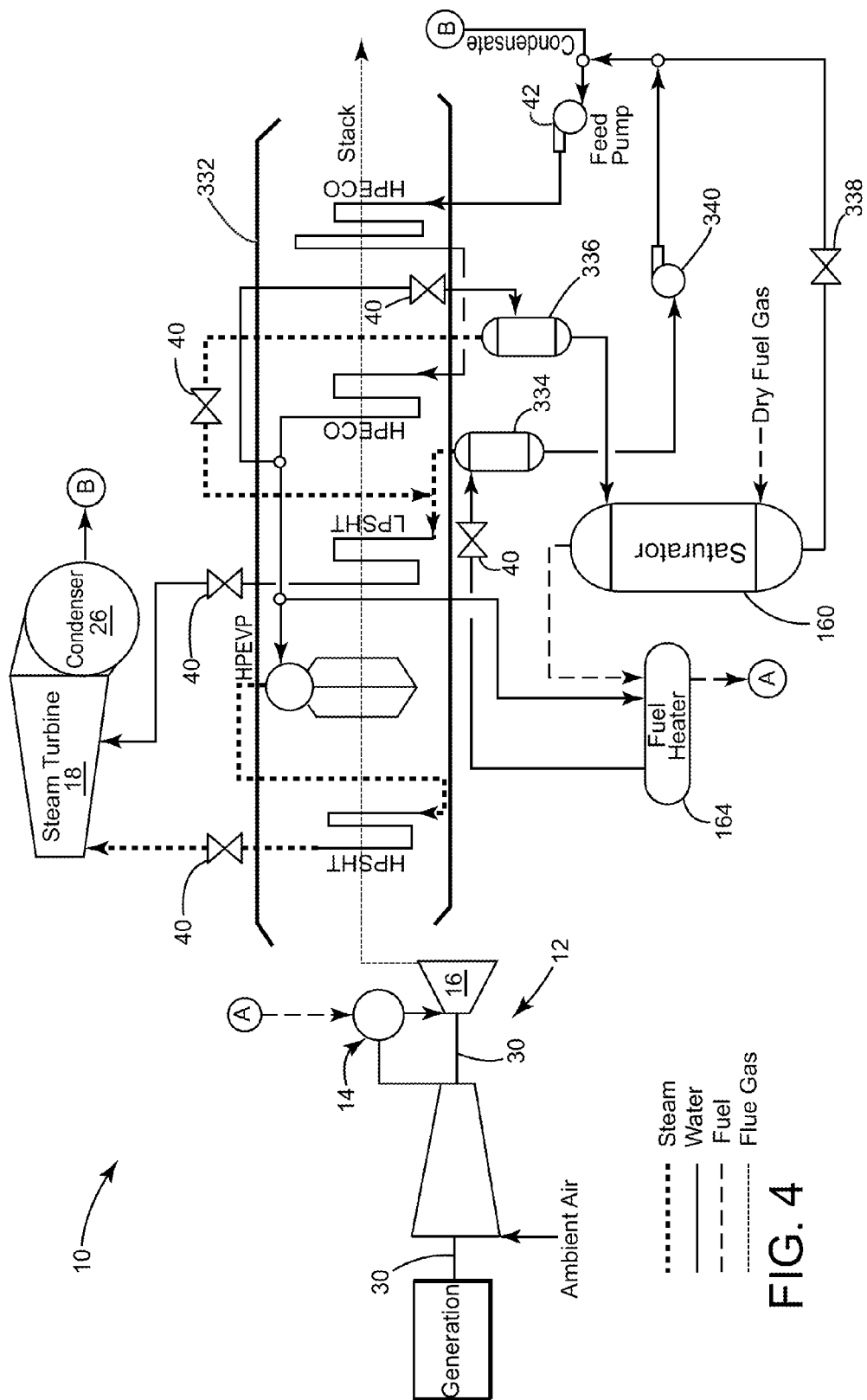
FIG. 4 is a schematic view of a power plant incorporating a single pressure, non-reheat, HRSG thermally coupled with a fuel moisturization system, in accordance with a second embodiment of the present invention.
Figure 5:
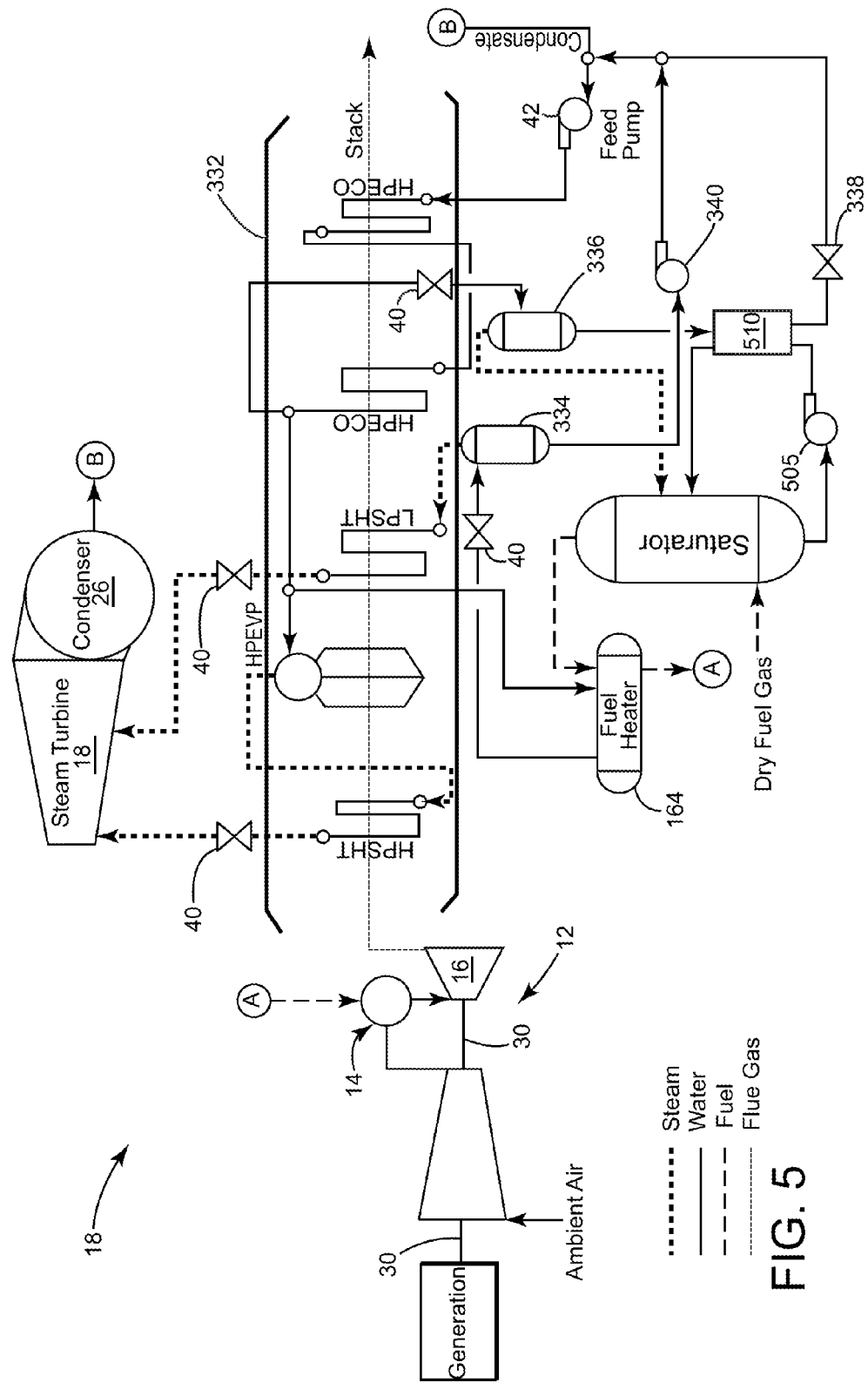
FIG. 5 is a schematic view of a power plant incorporating a single pressure, non-reheat, HRSG thermally coupled with a fuel moisturization system, in accordance with a third embodiment of the present invention.

FIGS. 3-5 illustrate different embodiments of the present invention. Operationally, embodiments of the present invention may increase the moisture content and the temperature of the fuel gas prior to entering the combustion system 14. For example, but not limiting of, embodiments of the present invention may increase the moisture content in a range of up to 35% by volume of water and may increase the temperature of the fuel gas up to 600 degrees Fahrenheit. These are the key driving principles behind the present invention. In the prior art, for example as described in U.S. Pat. No. 6,389,794, fuel moisturization utilizing the exhaust gas heat just before the HRSG stack could not reach this level of fuel gas moisture content due to the limited hot water temperature achievable in the fuel moisturizer heater 162.

Before discussing the differences of each embodiment, the commonality of the embodiments illustrated in FIGS. 3-5 are first discussed. Embodiments of the present invention provide components for the power plant 10. These components may comprise: a gas turbine 12, a HRSG 332, a fuel moisturizer 160, flash tanks 334, 336, and a fuel superheater 164.

As described, the gas turbine 12 generally comprises a compressor, a combustion system 14, and a turbine section 16. Operatively, the gas turbine 12 consumes ambient air and a fuel gas, and generates an exhaust gas stream.

As described below, the term "steam" will be used to denote the gaseous phase of the cycle working fluid. The term "water" will be used to denote the liquid phase of the cycle working fluid. While the cycle working fluid discussed herein is in the form of $H_2O$, other working fluids such as, but not limited to, organic fluids may also be used in embodiments of the present invention. These other working fluids should have characteristics similar to $H_2O$ such as, but not limited to, non-reactivity (no contribution to the fuel gas heating value) and physical properties including boiling point, specific heat, viscosity, etc.

The HRSG 332 generates steam and may generally comprise the form of a single pressure, non-reheat HRSG 332. A comparison between the HRSG 132 of FIG. 2 and the HRSG 332 of FIGS. 3-5, shows the substantial difference between the HRSGs 132, 332 configurations. HRSG 132 is a triple-pressure, reheat HRSG whereas HRSG 332 is a single pressure, non-reheat HRSG.

The HRSG 332 of the embodiments of the present invention comprises a heat exchanging section. This section comprises structure such as, but not limited to, tube bundles and associated piping that receives the exhaust gas from the gas turbine 12 and utilizes heat transferred from the exhaust gas to evaporate water into steam. An embodiment of the HRSG 332 may include a high pressure economizer (HPECO), a low pressure superheater (LPSHT), a high pressure evaporator (HPEVP), and a high pressure superheater (HPSHT).

The fuel moisturizer 160 may use water and/or steam to create saturated fuel gas. An embodiment of the fuel moisturizer 160 may have the form of a randomly packed column and may be vertically positioned. The fuel moisturizer 160 may be filled with a packing, such as, but not limited to, metal pieces. Functionally, the fuel moisturizer 160 promotes direct contact between the two media. Operationally, hot water from the HRSG 332 may enter the fuel moisturizer 160 near the top end; and the dry fuel gas may enter near the bottom end. These fluids contact each other while passing through the packing, which promotes heat and mass transfer between the hot water and dry fuel gas. An embodiment of the fuel moisturizer 160 may comprise the following components. A water inlet comprising piping that receives the hot water at a first temperature. A fuel gas inlet comprising piping that receives a fuel gas in an unsaturated condition (having some amount of water vapor); or a dry condition (having no water vapor) condition. A direct contact heat and mass transfer area (packing) that mixes the water and the fuel gas to create saturated fuel gas. A water outlet comprising piping that discharges the water at a second temperature that is lower than the first temperature; wherein the water flows through associated piping to the HRSG 332. A fuel gas outlet comprising piping that discharges saturated fuel gas.

The flash tank 336 may create steam from the water received from the HRSG 332. An embodiment of the flash tank 336 may comprise the following components. A supply comprising piping that receives heated water from the HRSG 332. A steam outlet comprising piping that discharges steam generated within the flash tank to the HRSG 332. A water discharge comprising piping that connects to the water inlet of the fuel moisturizer 160, allowing the water to flow from the flash tank 336 to the fuel moisturizer 160. Operationally, via rapid depressurization, the flash tank 336 may cause some of the water to flash to steam, which may discharge via the steam outlet. This may also cause the remaining water to discharge to the fuel moisturizer 160 via the water discharge.

Some embodiments of power plant 10 may be configured such that associated piping connects the steam outlet of the flash tank 336 to a section of the HRSG 332. Other embodiments of the power plant 10 may be configured such that associated piping operatively couples the supply of the flash tank 336 to the HP economizer.

The fuel superheater 164 may superheat the fuel gas that discharges from the fuel moisturizer 160. An embodiment of the fuel superheater 164 may comprise the following components. A water supply comprising piping that receives water at a first temperature from the HRSG 332. A fuel gas inlet comprising piping that receives the saturated fuel gas from the fuel moisturizer 160. A heat exchanging area that allows heat to transfer from the water to the saturated fuel gas, operatively creating superheated, saturated fuel gas. A water outlet comprising piping that discharges the water at a second temperature, which then flows through associated piping to the HRSG 332. A fuel gas outlet comprising piping that discharges the superheated, saturated fuel gas to the combustion system 14.

Turning specifically to FIG. 3, which is a schematic view of a power plant 10 incorporating a single pressure, non-reheat HRSG 332 thermally coupled with a fuel moisturization system, in accordance with a first embodiment of the present invention. Essentially, the embodiment illustrated in FIG. 3 applies to a power plant 10 configured for cogeneration operation. Here, steam generated by the HRSG 332 may be consumed by a process 300. The process 300 may include, but is not limited to: chemical processing, paper manufacturing, petrochemical applications, etc.

Water, which results from steam condensing, may be fed from condenser 26 to the HRSG 332 via feed pump 42. The water may then subsequently flow through the HPECO, which may comprise multiple sections. Next, as the water discharges from HPECO, a portion may be diverted to the flash tank 336, and the remaining water may flow to the HPEVP. The flash tank 336 may rapidly depressurize the high-pressure hot water to create steam and water at a lower pressure and temperature. The steam may discharge from the flash tank 336 and enter the LPSHT. The water may discharge from the flash tank 336 and enter the fuel moisturizer 160, which also receives the fuel gas in a relatively dry state from a fuel gas supply, which is not illustrated.

The fuel moisturizer 160 may operatively moisturize the fuel gas in a manner described above. The moisturized fuel gas may discharge from the fuel moisturizer 160 and enter the fuel heater 164 via associated piping. Water may discharge from the fuel moisturizer 160 and then return to the feed pump 42, via associated piping and a fuel moisturizer discharge valve 338.

As described, the fuel heater 164 may receive the moisturized fuel gas from the fuel moisturizer 160 and hot water from the HPECO section of the HRSG 332. After superheating the moisturized fuel, the superheated, moisturized fuel may discharge from the fuel heater 164 and flow, via associated piping, to the combustion system 14. The water may discharge from the fuel heater 164 and enter the flash tank 334 via associated piping and an admission valve 40. Here, the water may flash to steam and discharge from the flash tank 334 and enter the LPSHT of the HRSG 332. Water may discharge from the flash tank 334 and return to the water inlet of the HRSG 332 via associated piping, water pump 340 and feed water pump 42. The steam may discharge from the LPSHT and enter the process 300 via associated piping and an admission valve 40.

Meanwhile, water exiting the HPECO may enter the HPEVP where the water may evaporate to steam, discharge, and enter the HPSHT. Next, the steam may discharge from the HPSHT and enter the process 300 via associated piping and an admission valve 40.

Referring now to FIG. 4, which is a schematic view of a power plant 10 incorporating a single pressure, non-reheat HRSG 332 thermally coupled with a fuel moisturization system, in accordance with a second embodiment of the present invention. Essentially, the power plant 10 illustrated in FIG. 4 is configured such that the HRSG 332 provides steam to a steam turbine 18 instead of exporting steam to the process 300 illustrated in FIG. 3. Here, the steam turbine 18 may be operatively connected to HRSG 332 via associated piping and admission valve(s) 40, wherein the steam turbine 18 receives steam from the HRSG 332. The steam turbine 18 may also be connected the condenser 26, which allows the steam discharged by the steam turbine 18 to condense. The power plant 10 of this embodiment of FIG. 4 of the present invention may operate essentially the same as the embodiment of FIG. 3.

Referring now to FIG. 5, which is a schematic view of a power plant 10 incorporating a single pressure, non-reheat HRSG 332 thermally coupled with a fuel moisturization system, in accordance with a third embodiment of the present invention. Essentially, the power plant 10 illustrated in FIG. 5 may be configured with a circulation water (henceforth, circ-water) heating loop, which may provide more control over the temperature of water entering the fuel moisturizer 160. The circ-water heating loop may comprise a fuel moisturizer discharge pump 505 and a circ-water heater 510. The circ-water heating loop may integrate with the flash tank 336 as follows. Hot water exiting the flash tank 336 may enter an inlet of the circ-water heater, while the steam generated in the flash tank 336 may exit the flash tank 336 and then enter the fuel moisturizer 160, as illustrated in FIG. 5. Water discharging from the fuel moisturizer 160 may be sent via the fuel moisturizer discharge pump 505 to the circ-water heater 510, where it is heated by hotter water coming from the discharge of flash tank 336. Water from the flash tank 336, discharging from the circ-water heater 510 after heating the fuel moisturizer bottoms water, may return to the inlet of the HRSG 332 via associated piping and the saturation discharge valve 338.

An embodiment of the circ-water heating loop may comprise the following components. A circ-water heater 510 comprising an inlet fluidly connected to the water discharge of the flash tank 336. A discharge port connected to the water inlet of the fuel moisturizer 160. A circ-water pump 505 comprising an inlet port connected to the water outlet of the fuel moisturizer 160 and a discharge port connected to a receiving port on the circ-water heater 510.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

As one of ordinary skill in the art will appreciate, the many varying features and configurations described above in relation to the several embodiments may be further selectively applied to form other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A system comprising:
    a power plant comprising:
        a gas turbine comprising a compressor, a combustion system, and
        a turbine section which collectively generate an exhaust; and
        a HRSG comprising a heat-exchanging section that receives the exhaust and evaporates water into steam;
    a fuel moisturizer that creates saturated fuel gas, comprising:
        an inlet comprising piping that receives water at a first temperature;
        a fuel gas inlet comprising piping that receives the fuel gas in an unsaturated or a dry condition;
        a direct contact heat and mass transfer area that mixes the water and the fuel gas to create saturated fuel gas;
        an outlet that discharges the water at a second temperature, which is lower than the first temperature; wherein the water flows through associated piping to the HRSG; and
        a fuel gas outlet comprising piping that discharges the saturated fuel gas;
    a flash tank comprising:
        a supply comprising piping that receives water from the HRSG;
        a steam outlet comprising piping that discharges steam generated within the flash tank;
        a discharge comprising piping that connects to the inlet of the fuel moisturizer, allowing water to flow from the flash tank to fuel moisturizer; and
        wherein the flash tank rapidly reduces the pressure of the water received from the supply, causing a portion of the water to flash to steam, which discharges out the steam outlet, and causing the remaining portion of the water to flow to the fuel moisturizer via the discharge; and
    a fuel superheater comprising:
        a water supply comprising piping that receives water at a first temperature from the HRSG;

a fuel gas inlet comprising piping that receives the saturated fuel gas from the fuel moisturizer;
a heat exchanging area that allows heat to transfer from the water to the saturated fuel gas, operatively creating superheated, saturated fuel gas;
a water discharge comprising piping that discharges the water at a second temperature, and
a fuel gas outlet comprising piping that discharges the superheated, saturated fuel gas.

2. The system of claim 1, wherein the HRSG is in a configuration of a single pressure HRSG and further comprises:
a HP superheater section;
a LP superheater section;
a HP economizer section; and
a HP evaporator section.

3. The system of claim 1, wherein the power plant further comprises a steam turbine operatively connected to HRSG via associated piping, wherein the steam turbine receives steam from the HRSG and generates useful shaft power.

4. The system of claim 3 further comprising a condenser connected to the steam turbine, wherein the condenser comprises piping and structure that receives the steam from the steam turbine.

5. The system of claim 1 further comprising a processing plant connected to the HRSG via associated piping, wherein the HRSG sends steam to the processing plant.

6. The system of claim 1 further comprising associated piping that connects the steam outlet of the flash tank to the HRSG.

7. The system of claim of 2, wherein the flash tank is operatively coupled to HP economizer such that the supply of the flash tank derives from the HP economizer.

8. The system of claim 1, wherein the cycle working fluid exhibits characteristics similar to $H_2O$ in its liquid phase (water), in its gaseous phase (steam), or combinations thereof.

9. A system comprising:
a power plant comprising:
a gas turbine comprising a compressor, a combustion system, and
a turbine section which collectively generate an exhaust; and
a HRSG comprising a heat-exchanging section that receives the exhaust and evaporates water into steam;
a fuel moisturizer that creates saturated fuel gas, comprising:
an inlet comprising piping that receives water at a first temperature;
an inlet comprising piping that receives steam at a first temperature;
a fuel gas inlet comprising piping that receives the fuel gas in an unsaturated or a dry condition;
a direct contact heat and mass transfer area that mixes the steam and the water and the fuel gas to create saturated fuel gas;
an outlet that discharges the water at a second temperature, which is lower than the first temperature; wherein the water flows through associated piping to a circ-water heater; and
a fuel gas outlet comprising piping that discharges the saturated fuel gas;
a circ-water heating loop comprising:
the circ-water heater comprising an inlet fluidly connected to the water discharge of the flash tank; and
a discharge port connected to the water inlet of the fuel moisturizer;
a circ-water pump comprising an inlet port connected to the water outlet of the fuel moisturizer and a discharge port connected to a receiving port on the circ-water heater;
wherein the circ-water heating loop operatively assists with increasing the temperature of the water entering the fuel moisturizer;
a flash tank comprising:
a supply comprising piping that receives water from the HRSG;
a steam outlet comprising piping that discharges steam generated within the flash tank; wherein associated piping connects the steam outlet to the fuel moisturizer inlet;
a discharge comprising piping that connects to the inlet of the circ-water heater, allowing water to flow from the flash tank to circ-water heater; and
wherein the flash tank rapidly reduces the pressure of the water received from the supply, causing a portion of the water to flash to steam, which discharges out the steam outlet, and causing the remaining portion of the water to flow to the circ-water heater through the discharge; and
a fuel superheater comprising:
a water supply comprising piping that receives water at a first temperature from the HRSG;
a fuel gas inlet comprising piping that receives the saturated fuel gas from the fuel moisturizer;
a heat exchanging area that allows heat to transfer from the water to the saturated fuel gas, operatively creating superheated, saturated fuel gas;
a water discharge comprising piping that discharges the water at a second temperature, and
a fuel gas outlet comprising piping that discharges the superheated, saturated fuel gas.

* * * * *